(12) United States Patent
Pevere et al.

(10) Patent No.: US 12,597,843 B2
(45) Date of Patent: Apr. 7, 2026

(54) SWITCHING CONVERTER USING PARTIAL POWER PROCESSING

(71) Applicant: Infineon Technologies Austria AG, Villach (AT)

(72) Inventors: Alessandro Pevere, Villach (AT); Manuel Escudero Rodriguez, Vienna (AT)

(73) Assignee: Infineon Technologies Austria AG, Villach (AT)

( * ) Notice: Subject to any disclaimer, the term of this patent is extended or adjusted under 35 U.S.C. 154(b) by 299 days.

(21) Appl. No.: 18/235,383

(22) Filed: Aug. 18, 2023

(65) Prior Publication Data

US 2025/0062701 A1    Feb. 20, 2025

(30) Foreign Application Priority Data

Sep. 9, 2022    (EP) ..................................... 22194777

(51) Int. Cl.
H02M 1/00        (2007.01)
H02M 1/42        (2007.01)

(52) U.S. Cl.
CPC .......... H02M 1/007 (2021.05); H02M 1/0077 (2021.05); H02M 1/42 (2013.01)

(58) Field of Classification Search
CPC .......................................... H02M 1/007–0078
See application file for complete search history.

(56) References Cited

U.S. PATENT DOCUMENTS

| | | | | |
|---|---|---|---|---|
| 2011/0085354 A1* | 4/2011 | Wang | ................... | H02M 1/007 |
| | | | | 363/21.02 |
| 2015/0316596 A1* | 11/2015 | Blank | ................ | G01R 27/2694 |
| | | | | 324/659 |
| 2018/0175724 A1* | 6/2018 | Liu | ......................... | H02M 3/04 |

FOREIGN PATENT DOCUMENTS

| | | |
|---|---|---|
| CN | 109768729 A | 5/2019 |
| CN | 113271029 A | 8/2021 |
| CN | 114649955 A | 6/2022 |
| EP | 3337023 A1 | 6/2018 |

OTHER PUBLICATIONS

Extended European Search Report, EP 22 19 4777, Feb. 21, 2023, pp. 1-8.

* cited by examiner

*Primary Examiner* — Peter M Novak
(74) *Attorney, Agent, or Firm* — Armis IP Law, LLC

(57)        ABSTRACT

A power conversion circuit is described herein. In accordance with one embodiment, the circuit includes a first converter stage configured to provide a DC bus voltage and a second converter stage configured to receive the DC bus voltage and to generate an output voltage therefrom. The second converter stage includes at least a main branch and a partial power branch, wherein the main branch is configured to provide, at its output, a first voltage from the DC bus voltage based on a fixed conversion ratio and the partial power branch is configured to provide, at its output, an adjustable second voltage from the DC bus voltage. The outputs of the main branch and the partial power branch are connected in series to provide the output voltage. The circuit further includes a controller configured to control, in order to set the output voltage, the first converter stage to adjust the DC bus voltage and to control the partial power branch to adjust the second voltage.

22 Claims, 4 Drawing Sheets second configuration     third configuration     first configuration

| $V_R = -V_{PP}$ | | | $V_R = 0\ V$ | | | $V_R = +V_{PP}$ | | |
|---|---|---|---|---|---|---|---|---|
| $V_{BUS}$ | $V_{BAT}$ | $V_P$ | $V_{BUS}$ | $V_{BAT}$ | $V_P$ | $V_{BUS}$ | $V_{BAT}$ | $V_P$ |
| 340 | 250 | -56 | 340 | 306 | 0 | 340 | 362 | 56 |
| 350 | 258 | -57 | 350 | 315 | 0 | 350 | 372 | 57 |
| 360 | 265 | -59 | 360 | 324 | 0 | 360 | 383 | 59 |
| 370 | 273 | -61 | 370 | 333 | 0 | 370 | 394 | 61 |
| 380 | 280 | -62 | 380 | 342 | 0 | 380 | 404 | 62 |
| 390 | 287 | -64 | 390 | 351 | 0 | 390 | 415 | 64 |
| 400 | 295 | -66 | 400 | 360 | 0 | 400 | 426 | 66 |
| 410 | 302 | -67 | 410 | 369 | 0 | 410 | 436 | 67 |
| 420 | 309 | -69 | 420 | 378 | 0 | 420 | 447 | 69 |
|  |  |  | 430 | 387 | 0 |  |  |  |

FIG. 5

SWITCHING CONVERTER USING PARTIAL POWER PROCESSING

RELATED APPLICATION

This application claims priority to earlier filed European Patent Application Serial Number EP22194777 entitled "SWITCHING CONVERTER USING PARTIAL POWER PROCESSING," filed on Sep. 9, 2022, the entire teachings of which are incorporated herein by this reference.

TECHNICAL FIELD

The present disclosure relates to the field of switching converters that employ a partial power architecture to enable partial power processing.

BACKGROUND

Partial Power Processing (PPP) has proven to be an attractive solution regarding power converter downsizing and efficiency improvement. Furthermore, the advantages that PPP offers are very suitable for applications, such as, energy storage systems (ESS) connected to renewable sources as well as electric vehicle (EV) fast charging stations.

Partial Power (PP) converters are usually DC/DC converters, wherein the input DC voltage (DC bus voltage) may be provided by an additional AC/DC converter, which may perform Power Factor Correction (PFC). PP converters may employ, for example, a resonant LLC converter architecture (see, e.g. *Infineon, Application Note AN* 2012-09, *c*1.0, September 2012) which is widely used in battery charger applications. Resonant CLLC converter architectures are also commonly used.

A PP converter has usually two branches, one of which (i.e. the main branch) operates as a so-called (resonant) DC transformer (DCX) having a fixed conversion ratio, while the other branch (i.e. the PP branch) may include a regulator that is capable of regulating the output voltage to a desired level. The losses associated with the output voltage regulation accrue only in the PP branch which processes only a small fraction of the total output power of the PP converter.

In battery charger applications (e.g. for charging EV batteries) the DC bus voltage may be several hundred volts, e.g. 750 V, wherein the battery voltage may vary in a relatively wide range such as, for example, 250 to 450 V, dependent on the state of charge (SoC) of the battery. Accordingly, the PP converter of a battery charger needs to be able to regulate the output voltage in a relatively wide range (e.g. 350 V±100 V in the present example).

Besides of a wide output voltage range, typical requirements for battery chargers are a high efficiency with regard to the power conversion and a high power density. The wide output voltage range may require the use of transistor full-bridges with power transistors with a correspondingly high breakdown voltage (e.g. 150 V or more). In this regard, the inventor identified the need for improvements

SUMMARY

The above-identified problem can be solved by embodiments herein. Various embodiments and further developments are covered by the dependent claims.

A power conversion circuit is described herein. In accordance with one embodiment, the circuit includes a first converter stage configured to provide a DC bus voltage and a second converter stage configured to receive the DC bus voltage and to generate an output voltage therefrom. The second converter stage includes at least a main branch and a partial power branch, wherein the main branch is configured to provide, at its output, a first voltage from the DC bus voltage based on a fixed conversion ratio and the partial power branch is configured to provide, at its output, an adjustable second voltage from the DC bus voltage. The outputs of the main branch and the partial power branch are connected in series to provide the output voltage. The circuit further includes a controller configured to control, in order to set the output voltage, the first converter stage to adjust the DC bus voltage and to control the partial power branch to adjust the second voltage.

Moreover, a power conversion method is described herein. In accordance with one embodiment the method includes generating a DC bus voltage using a first converter stage and generating, using a second converter stage, an output voltage from the DC bus voltage, wherein the second converter stage includes at least a main branch and a partial power branch. Therein, generating the output voltage includes generating a first voltage from the DC bus voltage using a DC transformer circuit with a fixed conversion ratio arranged in the main branch and generating a second voltage from the DC bus voltage in the partial power branch, wherein the first voltage and the second voltage are superposed to generate the output voltage. The DC bus voltage and the second voltage are both adjusted such that the output voltage is set in accordance with a desired value.

A power conversion circuit includes: a power converter including a first power converter branch and a second power converter branch. The power converter is operative to receive an input voltage and convert the input voltage into an output voltage. For example, the first power converter branch is operative to convert the input voltage into a first voltage in accordance with a fixed ratio setting, the first voltage outputted from an output of the first power converter branch. The second power converter branch is operative to convert the input voltage into a second voltage, a controller operative to vary a magnitude of the second voltage outputted from an output of the second power converter branch. The output of the first power converter branch and the output of the second power converter branch are connected in series to produce the output voltage from the power converter as a summation of the first voltage and the second voltage.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings:

FIG. 5 is a table illustrating the function of the example of FIG. 4.

DETAILED DESCRIPTION

Figure 1:
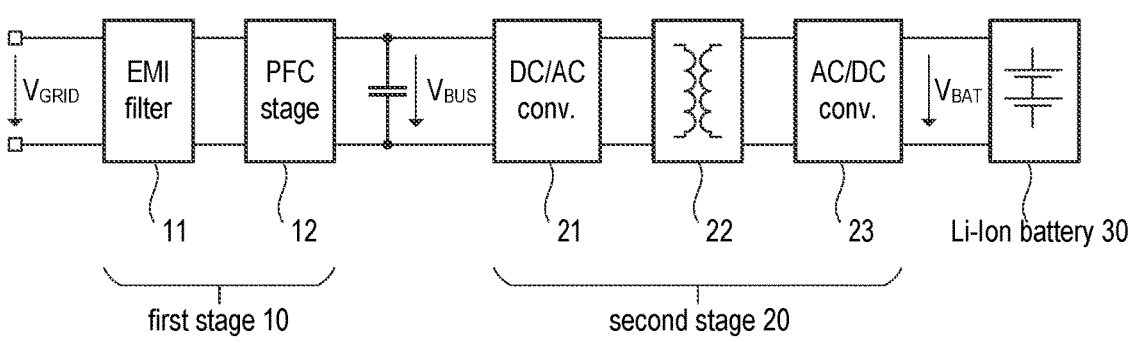
FIG. 1 illustrates a general example of a power conversion circuit with a PFC converter stage and a subsequent DC/DC converter stage for charging a battery.

FIG. 1 illustrates one example of a power converter circuit which may be used in a battery charger application. According to FIG. 1, the power converter circuit is composed of a first converter stage 10, which generates a DC bus voltage $V_{BUS}$ from an AC input voltage $V_{GRID}$, and a second converter stage 20, which is a DC/DC converter that generates the output voltage $V_{BAT}$ (applied to the battery 30) from the DC bus voltage $V_{BUS}$. The AC input voltage $V_{GRID}$ may be taken from the electric grid (e.g. $V_{GRID}$=230 V RMS), the DC bus voltage may be, for example, 750 V and the output voltage $V_{BAT}$ may vary dependent on the state of charge of the battery 30 (e.g. $V_{BAT}$=250 . . . 450 V). It is understood that the mentioned voltage values are merely an example and may be higher or lower dependent on the actual implementation. The battery 30 may be a lithium-ion battery or any other type of battery dependent on the application.

The first converter stage 10 may include an (optional) filter circuit 11 for eliminating voltage or current spikes due to electromagnetic interference (EMI) and a PFC converter stage 12, which usually has a boost converter topology. Suitable PFC converters are as such known and thus not discussed herein in greater detail. The PFC converter stage 12 is configured to generate the DC bus voltage $V_{BUS}$.

The second converter stage 20 may be a DC/DC converter which may use an LLC or a CLLC topology. According to the example of FIG. 1 the DC/DC converter 20 includes an inverter 21 (e.g. a transistor full-bridge), a transformer circuit 22 that includes a transformer and one or more inductances (L) and capacitances (C), and a rectifier circuit 23, which may include another transistor full-bridge configured to perform an active rectification. The transformer circuit 22 may be operated at a resonance frequency. Suitable LLC/CLLC converters are as such known and thus not discussed herein in greater detail. It should, however, be noted that other converter topologies (different from resonant LLC/CLLC converters) may also be used and the embodiments described herein are not limited with regard to the circuit topology of the DC/DC converter.

Figure 2:
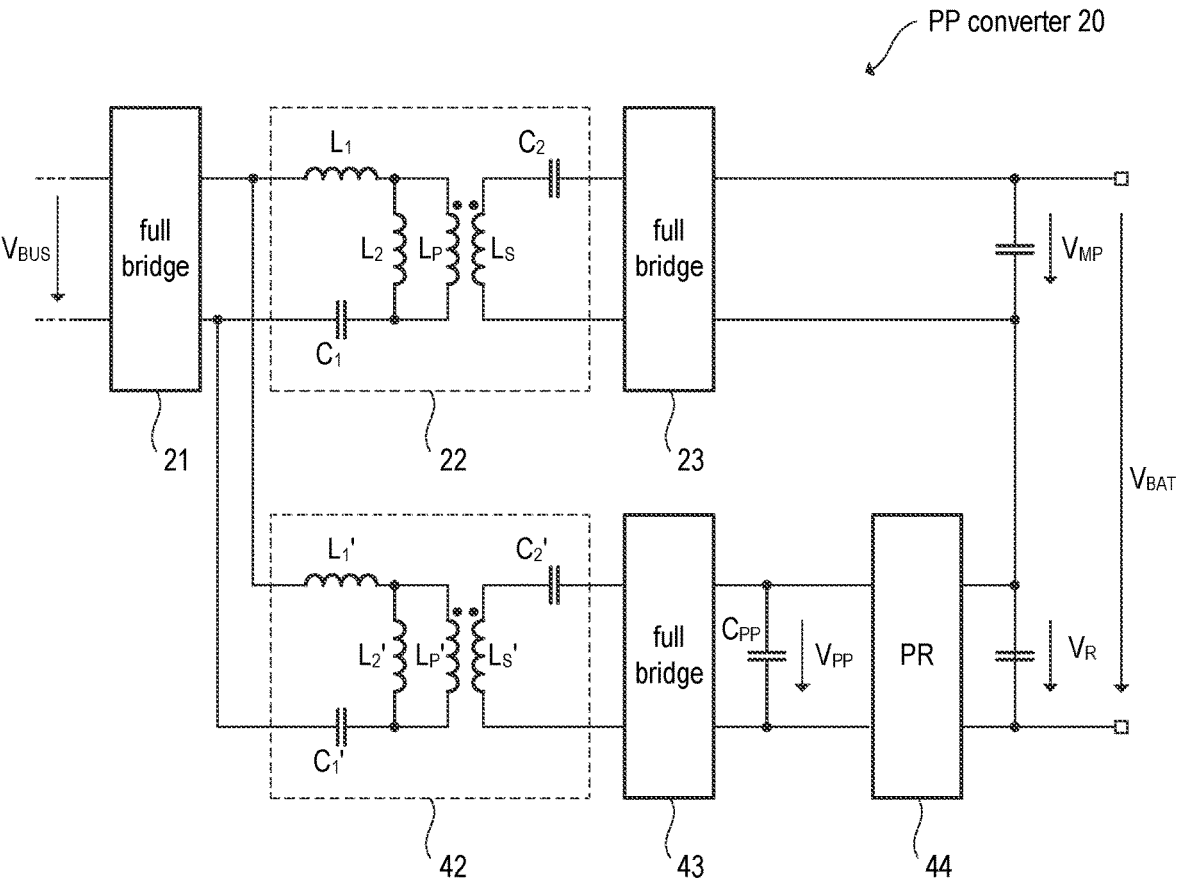
FIG. 2 illustrates a general example of a Partial Power (PP) converter, which may be used as DC/DC converter in the application shown in FIG. 1.

FIG. 2 illustrates an example of the second converter stage 20 (DC/DC converter). According to FIG. 2, the converter 20 is a Partial Power (PP) converter that includes two branches, which are referred to as main branch and PP branch. Most of the output voltage (and output power) of the PP converter is provided by the main branch (e.g. more than 75% of the input power), while the remaining power is provided by the PP branch. In order to achieve a high efficiency, it is desired to keep the fraction of the power processed by the PP branch low.

In the example of FIG. 2, the main branch includes the transistor full bridge 21 operating as inverter, the transformer circuit 22 (e.g. an CLLC circuit as mentioned above), and the transistor full bridge 23 operating as active rectifier. Dependent on the application, the transistor full bridge 23 may be replaced by a passive full-bridge rectifier composed of diodes. The output voltage of the main branch (i.e. the output voltage of the rectifier 23) is denoted as $V_{MP}$, and the output voltage $V_{MP}$ is buffered by a buffer capacitor $C_{MP}$ that is coupled to the output of the active rectifier 23.

In the present example, the operation of the inverter 21 and the active rectifier 23 is controlled by a controller (not shown in FIG. 2) such that the transformer circuit 22 is operated at its resonance frequency and that the main branch provides a fixed DC/DC conversion ratio $V_{MP}/V_{BUS}$. Various concepts and controller circuits for controlling the operation of inverter and active rectifier are as such known and thus not discussed herein in greater detail.

The PP branch includes the inverter 21 (which is also part of the main branch), the transformer circuit 42, and the transistor full bridge 43 operating as active rectifier. The transformer circuit 42 may have the same topology as the transformer circuit 22. Again, the active rectifier 43 may be replaced by a passive diode full-bridge rectifier. The output voltage $V_{PP}$ of the rectifier circuit 43 is buffered by a buffer capacitor $C_{PP}$ coupled to the output of the rectifier circuit 43. The DC transformer circuits (DCX) in both branches (i.e. inverter 21, transformer network 22 and rectifier 23 in the main branch and inverter 21, transformer network 42 and rectifier 43 in the PP branch) operate at a fixed frequency at or close to the resonance frequency of the transformer circuits 22, 42 in order to have fixed gain independent from load condition. In essence, DC transformers (DCX) are DC/DC converters operating with a fixed conversion ratio (ratio between DC output voltage and DC input voltage of the DCX).

The operation of components of the PP branch may be controlled using the same controller that controls the operation of the components of the main branch such that the transformer circuit 42 is operated at its resonance frequency and that the PP branch provides a fixed DC/DC conversion ratio $V_{PP}/V_{BUS}$. The output voltage $V_R$ of the PP branch is generated from the voltage $V_{PP}$ by a regulated DC/DC converter 44 (also referred to as post-regulator or output stage), which is configured to provide the regulated output voltage $V_R$. The output stage 44 (post-regulator) may be implemented, e.g. as a buck-converter.

The voltage $V_R$ is buffered by a buffer capacitor CR coupled to the output of the post-regulator 44. The outputs of the main branch and the PP branch are coupled in series, so that the total output voltage $V_{BAT}$ of the PP converter equals the sum $V_{MP}+V_R$. As mentioned above, the PP converter 20 of FIG. 2 may be used as second stage in the battery charger of FIG. 1.

In known concepts, the bus voltage $V_{BUS}$ is substantially constant. The regulation of the output voltage $V_{BAT}$ is accomplished by the post regulator 44 of the PP branch of the PP converter 20. This is consistent with the general idea of Partial Power Processing, according to which the power/voltage regulation is done in the PP branch of the PP converter to keep the losses associated with the power/voltage regulation low (because the PP branch carries only a small fraction of the total power).

Before discussing several embodiments in more detail, a specific example application of the circuit of FIG. 2 is considered. Accordingly, the bus voltage $V_{BUS}$ is assumed to be at its nominal value of 385 V resulting in a main branch output voltage $V_{MP}$ of 350 V (i.e. the conversion ratio is 0.9 in the present example). The desired output voltage range (of $V_{BAT}$) is from 250 V to 450 V. As a consequence, the PP branch must be designed to provide a regulated output voltage $V_R$ in the range from −100 V to +100 V. Assuming a defined output current (and neglecting losses), the ratio $k=P_{PP}/P_{IN}$ between the power $P_{PP}$ processed in the PP branch and the total (input) power $P_{IN}$ equals $V_R/(V_R+V_{MP})$, which is 0.22 for the maximum regulated voltage $V_R$=100 V. The ratio $P_{PP}/P_{IN}$=0.22 means that 22 percent of the total power are processed in the PP branch. Reducing the ratio would entail a respective reduction of the output voltage range. As indicated above, the fraction of power ($P_{PP}/P_{IN}$) processed in the PP branch should be low for a good efficiency.

In addition thereto, the breakdown voltage of the transistors used in the post regulator must be relatively high in the present example. With a regulated voltage $V_R$ of 100 V a typical design choice would be MOSFETs with a breakdown voltage of 150 V. Efficiency could be further increased when MOSFETs with a lower breakdown voltage (e.g. 80 V or 100 V) are used in the post-regulator 44. However, as indicated above, this would entail a reduction of the output voltage range, which would make the overall circuit unsuitable for specific applications. The examples discussed below address this conflict of objectives.

Figure 3:
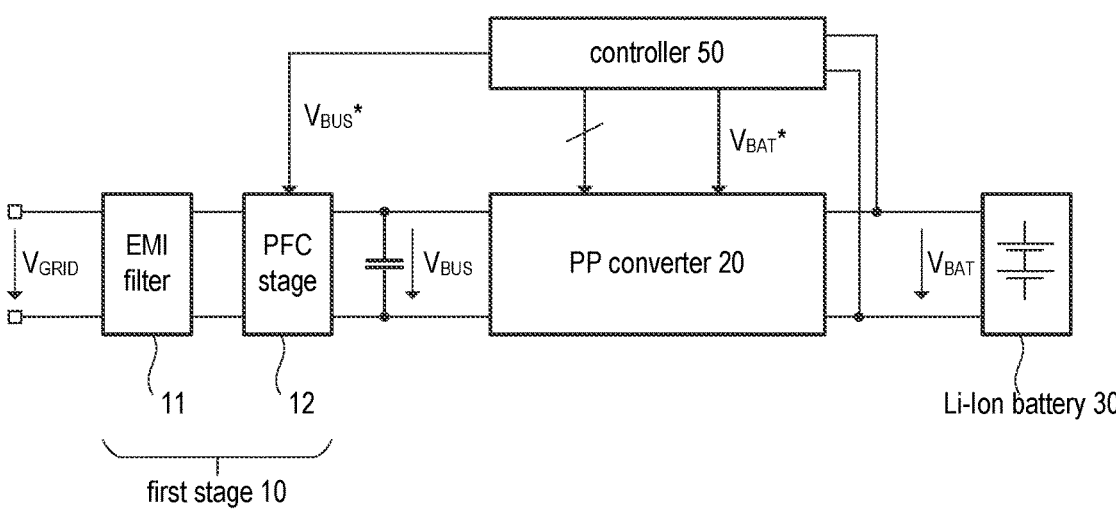
FIG. 3 illustrates one embodiment of a power conversion circuit with a PP converter and a controller that allows the adjustment of the DC bus voltage.

The example of FIG. 3 is basically the same as in FIG. 1, wherein the PP converter of FIG. 2 is used as second stage 20. Thus, reference is made to the explanations above. In addition to FIGS. 1 and 2, a controller 50 is shown in FIG. 3, which is configured to control the operation of the PP converter 20, which includes, inter alia, providing a set-point value $V_{BAT}{}^*$ for the output voltage $V_{BAT}$. However, different from the example explained above with reference to FIGS. 1 and 2, the controller 50 can adjust/modulate the bus voltage $V_{BUS}$ (by providing a respective set-point value $V_{BUS}{}^*$ to the PFC converter 12) dependent on the output voltage $V_{BAT}$ (e.g. dependent on the set-point value $V_{BAT}{}^*$)

Instead of operating with a constant bus voltage $V_{BUS}$, the controller 50 can adjust the bus voltage $V_{BUS}$ in the present example dependent on the total output voltage $V_{BAT}$ (or the corresponding set-point value $V_{BAT}{}^*$). With the adjustable bus voltage, the example discussed above can be modified as follows. The bus voltage $V_{BUS}$ is not constant at 385 V but can be varied from, e.g. 340 V to 430 V resulting in a main branch output voltage $V_{MP}$ ranging from 306 V to 387 V (again, the conversion rate is 0.9 in the main branch). The desired output voltage range (of $V_{BAT}$) is from 250 V to 450 V. To generate the maximum output voltage of 450 V the bus voltage $V_{BUS}$ may be set to the maximum value of 430 V (which results in $V_{MP}$=387 V), while the post regulator needs to generate a voltage $V_R$ of 63 V (i.e. $V_{BAT}=V_{MP}+V_R$=387 V+63 V=450 V). To generate the minimum output voltage of 250 V the bus voltage $V_{BUS}$ may be set to the minimum value of 340 V (which results in $V_{MP}$=306 V), while the post regulator needs to generate a voltage $V_R$ of −56V (i.e. $V_{BAT}=V_{MP}+V_R$=306V−56V=250 V).

It can be seen from the present example that, different from the previous example, the required output voltage range ($V_R$) of the PP branch can be reduced ±63 V without reducing the range of the total output voltage $V_{BAT}$ when the controller 50 (together with the PFC controller 12) is configured to adjust the bus voltage $V_{BUS}$. Accordingly, the post-regulator may be implemented with transistors that have a lower breakdown voltage (e.g. 80 V or 100 V) as compared to the previous example, in which the bus voltage $V_{BUS}$ is fixed. Assuming a defined output current (and neglecting losses), the ratio $k=P_{PP}/P_{IN}$ between the power $P_{PP}$ processed in the PP branch and the total (input) power $P_{IN}$ equals $V_R/(V_R+V_{MP})$, which is 0.14 for the maximum regulated voltage $V_R$=63 V, which is significantly lower as 0.22 without bus voltage adjustment.

Figure 4:
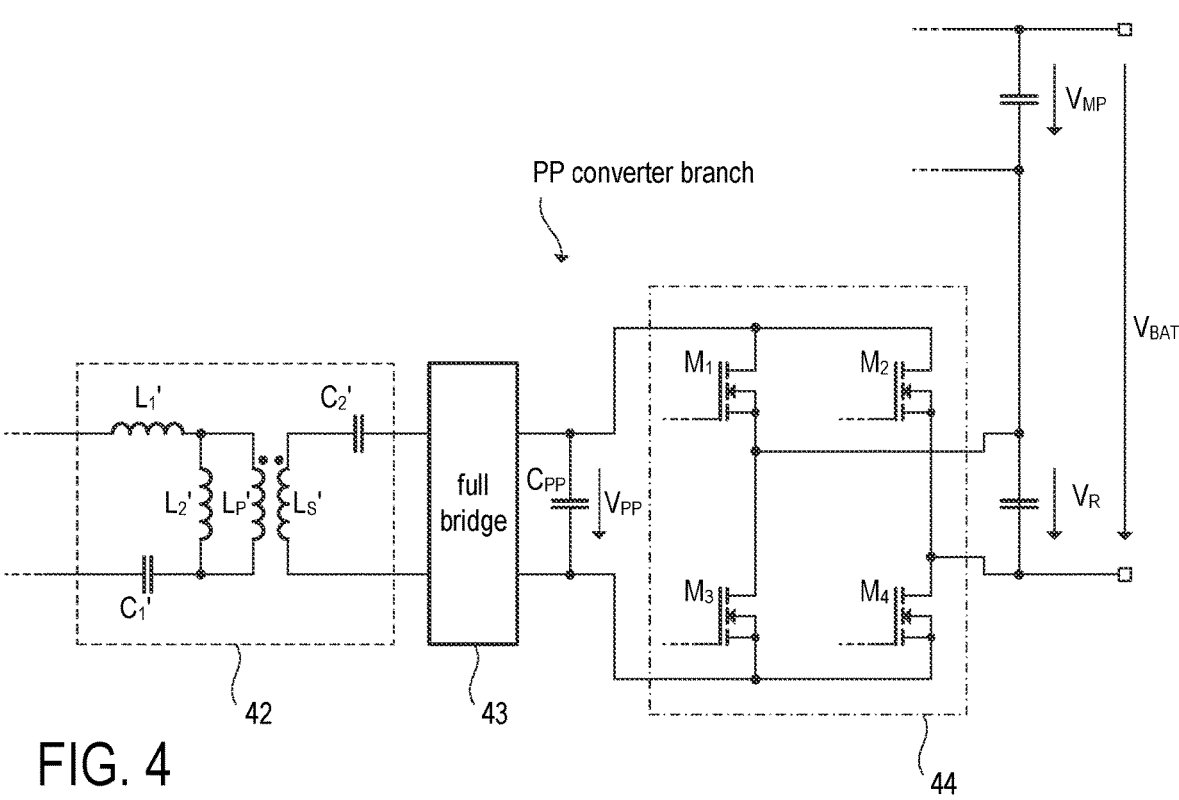
FIG. 4 illustrates a modification of the example of FIG. 2, in which the post regulator is implemented using a transistor H bridge.

FIG. 4 illustrates a modification of the PP converter of FIG. 2, in which the post regulator is implemented as a simple transistor H-bridge composed of transistors $M_1$, $M_2$, $M_3$, and $M_4$. The transistors $M_1$ and $M_3$ form a first transistor half bridge, and the transistors $M_2$ and $M_4$ form a second transistor half bridge. The transistors may be implemented as (e.g. Si or GaN) Metal-on-Semiconductor (MOS) field effect transistors (FETs) or the like. MOS transistors may have an intrinsic diode in parallel to the MOS channel (not shown in FIG. 4), whereas additionally dedicated free-wheeling diodes may be coupled to the transistors.

To keep the illustrations simple, parts of the main branch of the PP converter 20 have been omitted in FIG. 4 and, in essence, the PP branch is shown. The PP branch includes the inverter 21 (which is also part of the main branch, not shown in FIG. 4), the transformer circuit 42, and the transistor full bridge 43 operating as active rectifier. The output voltage $V_{PP}$ of the rectifier circuit 43 is buffered by a buffer capacitor $C_{PP}$ coupled to the output of the rectifier circuit 43. The post regulator 44 receives the output voltage $V_{PP}$ of the rectifier 43 so that the voltage $V_{PP}$ is applied across transistors H-bridge (i.e. the two transistor half bridges are essentially connected in parallel to the capacitor $C_{PP}$). The output voltage $V_R$ of the post regulator 44 is, in the present example, either +$V_{PP}$ or −$V_{PP}$ or 0 V when neglecting the voltage drops across the active (switched-on) transistors of the H-bridge.

As can be seen from FIG. 4, in the event that transistors $M_1$ and $M_4$ are active and transistors $M_2$ and $M_3$ are inactive (switched-off), the output voltage $V_R$ equals $V_{PP}$ (first configuration, $V_R=V_{PP}$). Similarly, in the event that transistors $M_2$ and $M_3$ are active and transistors $M_1$ and $M_4$ are inactive, the output voltage $V_R$ equals −$V_{PP}$ (second configuration, $V_R=-V_{PP}$). In the event that transistors $M_3$ and $M_4$ are active (and $M_1$ and $M_2$ are inactive), the output voltage $V_R$ equals zero (third/bypass configuration $V_R$=0V).

Driver circuits for driving the gate electrodes of the transistors $M_1$, $M_2$, $M_3$, and $M_4$ are omitted in FIG. 4 to keep the illustrations simple. Suitable driver circuits are as such known and thus not further discussed herein. The control/drive signals for switching the transistors $M_1$, $M_2$, $M_3$, and $M_4$ on and off may be generated by the controller 50 (see FIG. 3). Apart from the design of the post regulator, the example of FIG. 4 is structurally the same as the example of FIG. 2 and reference is made to the respective description above.

The function and the use of the embodiment of FIG. 4 (when used in the power conversion circuit of FIG. 3) is further illustrated by the tables of FIG. 5. Accordingly, in the right table, the values of the voltages $V_{BUS}$, $V_{BAT}$ and $V_R$ are shown for the second configuration ($V_R=-V_{PP}$). In the example of FIG. 5, the bus voltage $V_{BUS}$ is modified from 340 V to 420 V in steps of 10V. As in the previous example, the output voltage $V_{MP}$ of the main branch is proportional to the bus voltage $V_{BUS}$, e.g. $V_{MP}$=0.9 $V_{BUS}$ (fixed conversion ratio 0.9). Similarly, the voltage $V_{PP}$ of the PP branch is also proportional to the bus voltage $V_{BUS}$, e.g. $V_{MP}$=0.164 $V_{BUS}$ (fixed conversion ratio 0.164), wherein the post regulator 44 is configured to invert the voltage $V_{PP}$ (i.e. $V_R=-V_{PP}$). As a result, the total output voltage $V_{BAT}=V_{MP}-V_{PP}$ can be varied from 250V to 309V, as shown in the right table of FIG. 5, by varying the bus voltage $V_{BUS}$ from 340 V to 420 V. It is understood that the numbers shown in the table of FIG. 5 are merely an illustrative example. In some embodiments, a closed loop controller with non-linear control behavior may be used to accommodate the three configurations, i.e. to regulate the total output voltage $V_{BAT}$ and to switch between the three configurations.

When higher battery voltages are needed, the post regulator may be configured to output 0 V (third configuration. In this case the battery voltage $V_{BAT}$ equals the output voltage $V_{MP}$ of the main branch. The respective voltage values are shown in the middle table of FIG. 5. To achieve even higher battery voltages, the post regulator 44 may be again reconfigured to output $V_R=+V_{PP}$ (first configuration). As shown in FIG. 5, battery voltages ($V_{MP}+V_{PP}$) up to 447 V may be achieved for a bus voltage $V_{BUS}$ of 430 V.

As shown in FIG. 5 the output voltage of the PP branch is ±56 V and ±69 V for an exemplary conversion rate of 0.164. The voltage range of the PP branch may be reduced even further (e.g. ±33 V to ±47 V for a conversion ratio of 0.097 in the PP branch) if the maximum bus voltage $V_{BUS}$ is increased to 480 V. It is noted that the reconfiguration of the post regulator, which is illustrated by the dashed lines in FIG. 5, is not the only possible option. It should be emphasized that the numbers included in the tables of FIG. 5 are merely provided as an illustrative example. The numbers may be different (even significantly different) in other examples.

Figure 6:
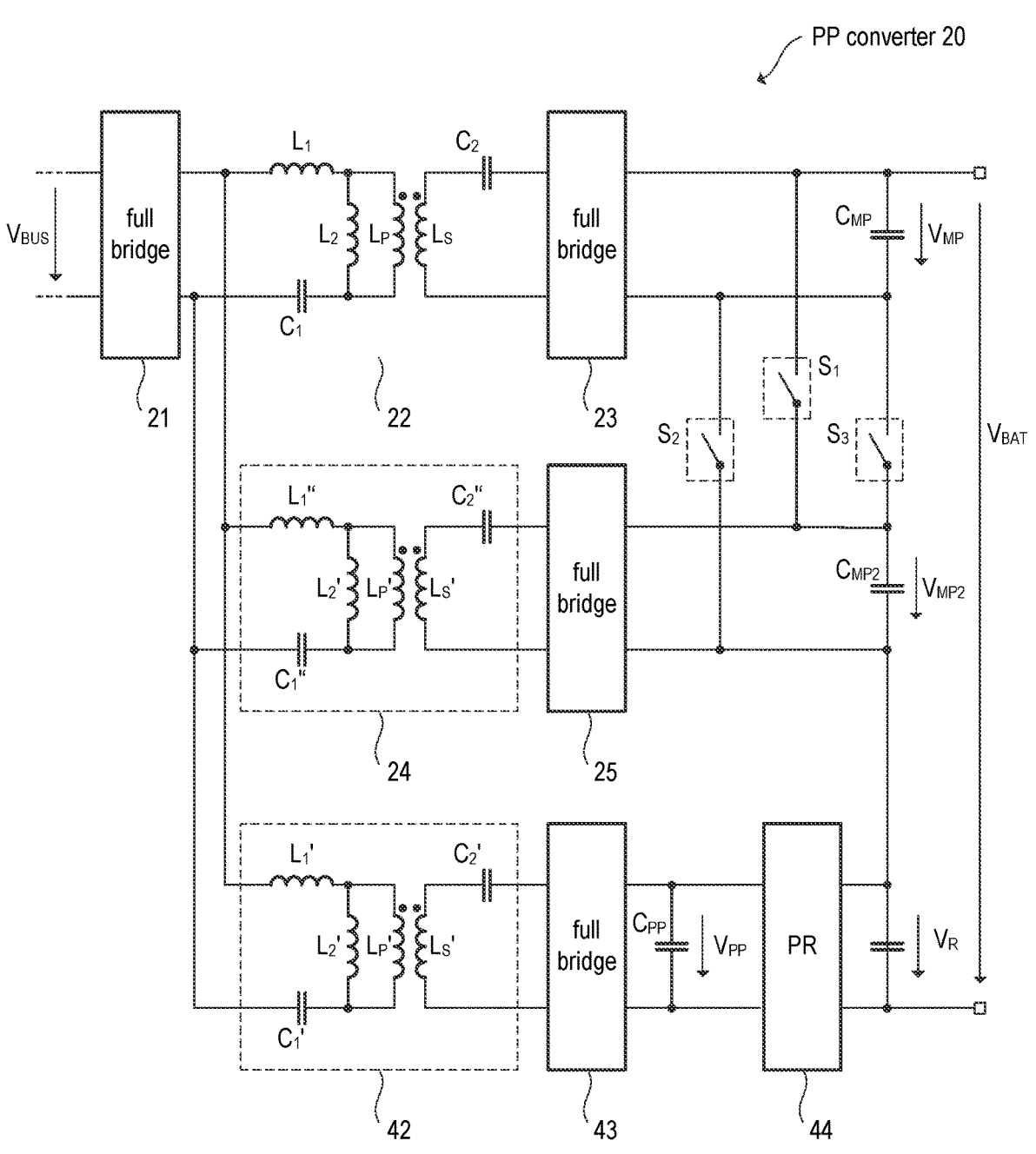
FIG. 6 illustrates another modification of the example of FIG. 2, in which the PP converter includes two main branches that can configurably be connected in series or in parallel.

FIG. 6 illustrates a further embodiment, in which the PP converter 20 includes two (or more) main branches and one PP branch, wherein the outputs of the different branches can be coupled in a configurable manner dependent on the required total output voltage (battery voltage $V_{BAT}$). In the depicted example, the outputs of the two main branches can be connected either in series or in parallel.

In the present example, the first main branch with the inverter 21 (commonly used by all branches), the transformer circuit 22, the rectifier circuit 23, and the buffer capacitor $C_{MP}$ is the same as the main branch in FIG. 2 and reference is made to the respective description above. The second main branch is composed of the inverter 21, the transformer circuit 52, the rectifier circuit 53, and the buffer capacitor $C_{MP2}$. Both, the first and the second main branches may be substantially identical. In particular the fixed conversion ratio may be the same for the first and the second main branch. Also the PP branch including the transformer circuit 42, the rectifier 43 and the post-regulator circuit 44 may be constructed in the same way as in the example of FIG. 2 and reference is made to the respective description above.

As mentioned the outputs of the two main branches, which provide the two respective output voltages $V_{MP}$ and $V_{MP2}$, may be connected either in series or in parallel using the switches $S_1$, $S_2$, and $S_3$. As can be seen from FIG. 6, the outputs of the two main branches are connected in series when the switches $S_1$ and $S_2$ are open ($S_1$=0, $S_2$=0) and the switch $S_3$ is closed ($S_3$=1). Conversely, the outputs of the two main branches are connected in parallel when the switches $S_1$ and $S_2$ are closed ($S_1$=1, $S_2$=1) and the switch $S_3$ is open ($S_3$=0). The control signals, which control the switching state of the switches $S_1$, $S_2$, and $S_3$, may be generated by the controller 50 (see FIG. 3) dependent on the required total output voltage $V_{BAT}$ (battery voltage in the exemplary application described herein). Accordingly, the total output voltage $V_{BAT}$ may either be 2. $V_{MP}+V_R$ Or $V_{MP}+V_R$ dependent on the switching state of the switches $S_1$, $S_2$, and $S_3$ (and provided that $V_{MP}2=V_{MP}$).

The post regulator 44 may be, for example, a DC/DC converter with a controllable conversion ratio or an H-bridge as discussed above with reference to FIG. 4. In this case, the total output voltage $V_{BAT}$ may be 2. $V_{MP}+V_{PP}$, 2·$V_{MP}$, 2·$V_{MP}-V_{PP}$ (main branches connected in series), $V_{MP}+V_{PP}$, $V_{MP}$, or $V_{MP}-V_{PP}$ (main branches connected in parallel) dependent on the switching state of the switches $S_1$, $S_2$, and $S_3$ and further dependent on the state of the H-bridge used in the post regulator 44 (if, as mentioned, $V_{MP}2=V_{MP}$).

It is understood that the switches $S_1$, $S_2$, and $S_3$ may be implemented using any type of electronic switches/transistors, such as MOSFETs, IGBTs, bipolar junction transistors, or the like. Suitable driver circuits for switching the transistors on and off are as such known and thus omitted in the figures and not further discussed herein. Alternatively, the switches $S_1$, $S_2$, and $S_3$ may be implemented using any other type of switches capable of blocking in both direction such as, e.g., (electronic or electromechanical) relays. Generally, the possibility to connect the two main branches in series allows for a configurable extension of the available voltage range. It is understood that, in alternative embodiments, the second main branch may also be deactivated (e.g. by switching off all switches of the synchronous rectifier 25) instead of a parallel connection with the first main branch. Furthermore, the concept described in connection with FIG. 6 may also be generalized to more than two main branches.

The example of FIG. 6 may be used in applications with and without bus voltage adjustment. In one specific embodiment, the PP converter 20 of FIG. 6 is used in the power conversion circuit of FIG. 3 with an H-bridge as post regulator 44 (as shown in FIG. 4) and bus voltage regulation (as shown in FIG. 5). In another embodiment, the PP converter 20 of FIG. 6 is used in the power conversion circuit of FIG. 3 without bus voltage adjustment (i.e. with a fixed bus voltage $V_{BUS}$) but with a post regulator 44 that has a controllable conversion ratio.

It is understood, that the application (power conversion circuit) depicted in FIG. 3 is merely an example. Although it may be advantageous in many applications that the first converter stage 10 performs a power factor correction, it is understood that this is not necessarily the case. Also the EMI filter 11 may be omitted in the first stage 10 in some applications. In the example of FIG. 3, the first converter stage 10 receives an AC voltage $V_{GRID}$ and the first stage 10 performs an AC/DC conversion to generate the DC bus voltage $V_{BUS}$. In other examples, the first converter stage 10 may receive a DC input voltage; in this example the first stage 10 has to perform a DC/DC conversion to generate the bus voltage $V_{BUS}$. In embodiments, in which a bus voltage adjustment is needed, the first converter stage 10 has to include a (AC/DC or DC/DC) switching converter that allows to adjust/control its output voltage $V_{BUS}$.

The controller 50 (see FIG. 3) which generates control signals for the switching converters included in the power conversion circuit is not necessarily a single component/device. Rather, the function of the controller may be distributed between several different circuits, which may (or may not) communicate with each other. For example, the controller 50 may include a hierarchical structure of control circuits, i.e. several low level control circuits controlled by one or more high level control circuits. The controller 50, or parts thereof, may be implemented using a processor which is configured to execute software instructions stored in a memory, wherein the software instructions determine the desired function. Additionally or alternatively, a similar or the same function may be achieved by hard-wired or one-time programmable logic circuitry. In addition to digital/logic circuits, the controller 50 or parts thereof may include analog circuitry.

In the following several aspects of the embodiments described herein are summarized. It is emphasized that the following is not a complete list of essential features but rather an exemplary summary of various aspects.

Some embodiments relate to a power conversion circuit (see, e.g. FIGS. 2-4 and 6). In accordance with one embodiment, the circuit includes a first converter stage configured to provide a DC bus voltage $V_{BUS}$ and a second converter stage configured to receive the DC bus voltage $V_{BUS}$ and to generate an output voltage $V_{BAT}$ therefrom. The second converter stage includes at least a main branch and a partial power branch (see, e.g. FIGS. 2 and 6). The main branch is configured to provide, at its output, a first voltage $V_{MP}$ based on the DC bus voltage $V_{BUS}$ and using a fixed conversion ratio setting. The partial power branch is configured to provide, at its output, an adjustable second voltage $V_R$ based on the DC bus voltage $V_{BUS}$. The outputs of the main branch and the partial power branch are connected in series to provide the output voltage $V_{BAT}$. The circuit further includes a controller (see FIG. 3, controller 50) that is capable to set the output voltage. For this purpose the controller controls (the operation of) the first converter stage to adjust the DC bus voltage. The controller further controls (the operation of) the partial power branch to adjust the second voltage.

In one embodiment, the main branch may comprise a first DC transformer including an inverter, a resonant transformer circuit and a rectifier (see, e.g. FIG. 2), whereas the partial power branch comprises a second DC transformer including the inverter, a further resonant transformer circuit and a further rectifier. The partial power branch further comprises an output stage (post-regulator) that is connected to the second DC transformer downstream thereof. The output stage is configured to generate the second voltage from an output voltage of the second DC transformer.

In some embodiments, the output stage/post regulator (see FIG. 2 or 6) may include a switching converter (e.g. a buck converter) that allows the adjustment of its output voltage which is provided by the partial power branch as second voltage $V_R$. In other embodiments, the output stage (see FIG. 4) may include a transistor H-bridge. As discussed in detail further above, the H-bridge is configured to provide—as second voltage $V_R$ and dependent on drive/control signals provided by the controller—one of the following: zero volts, the output voltage $V_{PP}$ of the second DC transformer, or the inverted output voltage $-V_{PP}$ of the second DC transformer. The mentioned drive/control signals may be logic signals indicating the configuration of the H-bridge, i.e. indicating which transistors of the H-bridge are on and off.

In a further embodiment, the second converter stage includes a second main branch that is configured to provide, at its output, a third voltage $V_{MP2}$ (see FIG. 6) from the DC bus voltage $V_{BUS}$ with the same fixed conversion ratio as the first main branch. In this embodiment, the second converter stage includes a switching circuit (see FIG. 6, switches $S_1$, $S_2$, and $S_3$), which is configured to connect the outputs of the first and second main branches either in series or in parallel. The configuration of the switching circuit may also be controlled by the controller. This embodiment may also be operated with a fixed bus voltage $V_{BUS}$.

With the embodiments described herein, the output stage of the partial power branch may be implemented with transistors that have a lower breakdown voltage as in conventional approaches (e.g. 80 V or 100 V instead of 150 V).

Some embodiments relate to a power conversion method. In accordance with one embodiment the method includes generating a DC bus voltage $V_{BUS}$ using a first converter stage and generating, using a second converter stage, an output voltage $V_{BAT}$ from the DC bus voltage $V_{BUS}$. For this purpose, the second converter stage includes at least a main branch and a partial power branch. Generating the output voltage $V_{BAT}$ includes the generation of a first voltage $V_{MP}$ from the DC bus voltage $V_{BUS}$ using a DC transformer circuit and a fixed conversion ratio arranged in the main branch and generating a second voltage $V_R$ from the DC bus voltage $V_{BUS}$ in the partial power branch, wherein the first voltage and the second voltage are superposed to generate the output voltage ($V_{BAT}=V_R+V_{MP}$). In order to set the output voltage $V_{BAT}$ in accordance with a desired value, the DC bus voltage $V_{BUS}$ and the second voltage $V_R$ are both adjusted to achieve the desired result.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond-unless otherwise indicated—to any component or structure, which performs the specified function of the described component (e.g., that is functionally equivalent), even though not structurally equivalent to the disclosed structure, which performs the function in the herein illustrated exemplary implementations of the invention.

The invention claimed is:

1. A power conversion circuit comprising:
   a first converter stage configured to generate a DC bus voltage;
   a second converter stage configured to generate an output voltage based on the DC bus voltage;
   wherein the second converter stage includes at least a main branch circuit and a partial power branch circuit;
   wherein the main branch circuit is configured to implement a fixed conversion ratio setting to convert the DC bus voltage into a first voltage;
   wherein the partial power branch circuit is configured to convert the DC bus voltage into a second voltage;
   wherein an output of the main branch circuit and an output of the partial power branch circuit are connected in series to produce the output voltage, the output voltage being a summation of the first voltage and the second voltage; and
   a controller configured to, in order to set a magnitude of the output voltage, control: i) the first converter stage to adjust and vary a magnitude of the DC bus voltage, and ii) the partial power branch circuit to adjust a magnitude of the second voltage.

2. The power conversion circuit of claim 1, wherein the main branch circuit comprises a first DC transformer including an inverter, a resonant transformer circuit, and a rectifier; and
   wherein the partial power branch circuit comprises a second DC transformer including the inverter, a resonant transformer circuit and a rectifier and wherein the partial power branch circuit comprises an output stage connected to the second DC transformer downstream thereof, the output stage being configured to generate the second voltage from an output of the second DC transformer.

3. The power conversion circuit of claim 2, wherein an output stage of the power conversion circuit includes a switching converter.

4. The power conversion circuit of claim 2, wherein the output stage includes a transistor H-bridge configured to provide—as the second voltage and dependent on drive signals provided by the controller—at least one of: zero volts, the output voltage of the second DC transformer, the inverted output voltage of the second DC transformer.

5. The power conversion circuit of claim 1, wherein the main branch circuit is a first main branch circuit, wherein the second converter stage further includes a second main branch circuit configured to provide, at its output, a third voltage from the DC bus voltage derived based on the fixed conversion ratio setting, and wherein the second converter stage further includes a switching circuit, which is configured to switch between connecting outputs of the main branch circuit and the second main branch circuit in series and in parallel, the switching circuit being controlled by the controller.

6. The power conversion circuit as in claim 1, wherein the main branch circuit and the partial power branch circuit both include a respective resonant LLC DC transformer circuit.

7. The power conversion circuit as in claim 1, wherein the first converter stage includes an AC/DC converter configured to generate the DC bus voltage from a received AC input voltage; and wherein the AC/DC converter is configured to receive, from the controller, a control signal representing a set point for controlling a magnitude of the DC bus voltage.

8. The power conversion circuit as in claim 1, wherein the main branch circuit is a first main branch circuit;

wherein the fixed conversion ratio setting is a first fixed conversion ratio setting;

wherein the second converter stage further comprises:

a second main branch circuit configured to convert, based on a second fixed conversion ratio setting, the DC bus voltage into a third voltage; and a switching circuit configured to connect an output of the first main branch circuit and the second main branch circuit either in series or in parallel, so that the second voltage adds to a common voltage provided by the first and second main branches to generate the output voltage.

9. The power conversion circuit of claim 8, wherein the controller is further configured to, in order to set the output voltage, control the switching circuit in order to connect the outputs of the main branch circuit and the further main branch either circuit in series or in parallel.

10. The power conversion circuit as in claim 1, wherein the implementation of the fixed conversion ratio setting in the main branch circuit is operative to control a magnitude of the first voltage to be proportional to the adjusted magnitude of the DC bus voltage.

11. The power conversion circuit as in claim 1, wherein the main branch circuit includes a first full bridge rectifier, a resonant transformer circuit, and a second full bridge rectifier; and wherein the controller is configured to control operation of the first full bridge rectifier and the second full bridge rectifier.

12. The power conversion circuit as in claim 11, wherein the first full bridge rectifier is operative to convert the DC bus voltage into a first intermediate voltage supplied to the resonant transformer circuit;

wherein the resonant transformer circuit includes a primary winding magnetically coupled to a secondary winding, the primary winding of the resonant transformer circuit operative to receive the first intermediate voltage, the secondary winding of the resonant transformer circuit operative to output a second intermediate voltage to the second full bridge rectifier.

13. The power conversion circuit as in claim 12, wherein the second full bridge rectifier is operative to convert the second intermediate voltage into the first voltage.

14. The power conversion circuit as in claim 1, wherein the adjustment of the magnitude of the DC bus voltage and the adjustment of the magnitude of the second voltage is operative to set the magnitude of the output voltage to a desired voltage value.

15. The power conversion circuit as in claim 1, wherein the output of the main branch circuit includes a first node and a second node;

wherein the output of the partial power branch circuit includes a third node and a fourth node, the second node directly connected to the third node;

wherein a combination of the first node and the second node output the first voltage; and wherein a combination of the third node and the fourth node output the second voltage.

16. The power conversion circuit as in claim 15, wherein the implementation of the fixed conversion ratio setting in the main branch circuit is operative to control a magnitude of the first voltage to be proportional to the adjusted magnitude of the DC bus voltage.

17. A power conversion circuit comprising:

a first converter stage configured to adjust and vary a magnitude of a DC bus voltage outputted from the first converter stage;

a second converter stage configured to convert the DC bus voltage into the output voltage, and a controller;

wherein the second converter stage includes at least a first main branch, a second main branch, and a partial power branch, wherein the first main branch and the second main branch are each configured to provide, at their outputs, a respective first voltage from the DC bus voltage based on a fixed conversion ratio, wherein the second converter stage includes a switching circuit configured to switch between connecting the outputs of the first main branch and the second main branch in series and in parallel, wherein the partial power branch is configured to provide, at its output, an adjustable second voltage derived from the DC bus voltage and wherein the partial power branch is coupled to the first main branch and the second main branch such that the second voltage is added to a common voltage to generate the output voltage, the common voltage being generated by the first main branch and the second main branch, and wherein the controller is configured to, in order to set a magnitude of the output voltage to a desired value: i) control the switching circuit in order to connect the first main branch and second main branch either in series or in parallel, and ii) control the partial power branch to adjust a magnitude of the second voltage.

18. A method comprising:

via a first converter stage of a power conversion circuit, generating a DC bus voltage;

via a second converter stage of the power conversion circuit, generating an output voltage from the DC bus voltage;

wherein the second converter stage includes at least a main branch circuit and a partial power branch circuit;

wherein generating the output voltage includes:

via the main branch circuit, implementing a first DC transformer circuit with a fixed conversion ratio setting to convert the DC bus voltage into a first voltage;

via the partial power branch circuit, converting the DC bus voltage into a second voltage, wherein the first voltage and the second voltage are superposed to generate the output voltage such that a magnitude of the output voltage is equal to a summation of a magnitude of the first voltage and a magnitude of the second voltage; and the method further comprising: adjusting and varying a magnitude of the DC bus voltage and the magnitude of the second voltage such that the magnitude of the output voltage is set in accordance with a desired value.

19. The method of claim 18, wherein the first DC transformer circuit includes a transformer circuit and wherein the first DC transformer circuit is operated at a resonance frequency of the transformer circuit to convert the DC bus voltage into the first voltage.

20. The method of claim 18, wherein the partial power branch includes: i) a second DC transformer circuit with the fixed conversion ratio setting to convert the DC bus voltage into a third voltage, and ii) an output stage coupled downstream of the second DC transformer circuit, wherein the output stage is configured to adjust the magnitude of the second voltage.

21. The method of claim 20, wherein the second voltage is a selected one of the following: an output voltage of the second DC transformer circuit, the inverted output voltage of the second DC transformer circuit, or zero volts, wherein the selection depends on the desired value of the output voltage.

22. The method of claim 18, wherein the DC transformer circuit is a first DC transformer circuit, wherein the main branch circuit is a first main branch circuit, wherein the fixed conversion ratio setting is a first fixed conversion ratio setting, the method further comprising:

generating a third voltage from the DC bus voltage via a second DC transformer circuit disposed in a second main branch circuit, the second DC transformer circuit operative to implement a second fixed conversion ratio setting to convert the DC bus voltage into a third voltage;

via a switching circuit, switching between connecting the first main branch and the second main branch in parallel versus in series dependent on the desired value.

* * * * *